United States Patent [19]

Kamlukin

[11] Patent Number: 5,667,032
[45] Date of Patent: Sep. 16, 1997

[54] SELF PROPELLED MOWER WITH LOW RADIUS PIVOTED REAR WHEEL STEERING

[76] Inventor: Igor Kamlukin, 11506 N. Shorecliff La. 2W, Mequon, Wis. 53092

[21] Appl. No.: 361,412

[22] Filed: Dec. 22, 1994

[51] Int. Cl.⁶ .................................................. B60K 17/30
[52] U.S. Cl. ........................... 180/256; 180/253; 180/258; 180/900
[58] Field of Search .................................. 180/252, 253, 180/254, 255, 256, 257, 260, 258, 261, 263, 266, 6.32, 900; 280/98, 103, 87.2, 776, 760; 56/11.1, 11.3

[56] References Cited

U.S. PATENT DOCUMENTS

| | | | |
|---|---|---|---|
| 1,095,916 | 5/1914 | Nichols | 180/233 |
| 1,284,984 | 11/1918 | Barnes | 180/257 |
| 1,676,322 | 7/1928 | Chilton | 180/257 |
| 1,782,361 | 11/1930 | Matschei | 280/96.1 |
| 2,948,546 | 8/1960 | Fabere et al. | 180/253 |
| 3,031,024 | 4/1962 | Ulinski | 180/253 |
| 3,110,352 | 11/1963 | McClarnon | 180/254 |
| 4,069,887 | 1/1978 | Koepfli | 180/257 |
| 4,887,686 | 12/1989 | Takei | 180/211 |
| 4,982,799 | 1/1991 | Fujimoto et al. | 180/900 |
| 5,209,314 | 5/1993 | Nishiyama | 180/900 |
| 5,230,403 | 7/1993 | Matsuda et al. | 180/900 |
| 5,518,079 | 5/1996 | Zovblanek | 180/252 |

OTHER PUBLICATIONS

Applicant's Exhibit 1, 8 pgs., "Honda Multi-Purpose Tractors" brochure for Model Nos. H5013A2, H5013A4, H5518A2 and H5518A4 4-wheel steering tractors, admitted prior art.

Applicant's Exhibit 2, "White Outdoor Power Tractors" brochure, 2 pgs., for Model No. FST-15 4-wheel steering tractor, admitted prior art.

Applicant's Exhibit 3, 14 pg. "Dixon ZTR Riding Mowers" brochure, admitted prior art.

Primary Examiner—Anne Marie Boehler
Attorney, Agent, or Firm—Quarles & Brady

[57] ABSTRACT

A riding or walk-behind self-propelled lawn mower has pivoted rear axles so that the mower is steerable to a low turning radius as measured off a lateral edge of the mower deck. The rear wheels are supported on a crossbar which is fixed at its middle to the main frame, supports at its ends double universal joints, each of which drives one of the rear wheels, and together with the frame provides spaces into which the rear wheels may pivot during a minimum radius turn. The front wheels may be steerable or free pivoted casters.

8 Claims, 7 Drawing Sheets

SELF PROPELLED MOWER WITH LOW RADIUS PIVOTED REAR WHEEL STEERING

BACKGROUND OF THE INVENTION

1. Field of the Invention

This invention relates to power driven self propelled lawn mowers of the type that are steerable, and in particular of the type in which the rear wheels are steerable.

2. Discussion of the Prior Art

A problem in operating self propelled steerable lawn mowers, such as riding lawn tractors or walk behind mowers, is in maneuvering the mower when turning around a corner, a tree or other obstacle so as to cut the entire area of grass in a single pass, without having to back-up, do a second pass, or do excessive finish trimming. As a solution to the problem, lawn tractors have been made in which the rear wheel axles are pivoted so that the rear wheels can be steered, but this has still resulted in a relatively large turning radius, for example approximately 14" off the edge of the mower deck.

In another type of riding lawn mower, the rear wheel axles are not pivoted but are fixed, and a relatively complex friction drive transmission is used to transfer power independently to each rear wheel so that the two rear wheels can be turning at different speeds in the same direction, or can be turning in different directions to effect turning of the mower. In this type of mower, the front wheels are free pivoted casters which are not steerable. Also, this type of tractor is typically steered by operating a pair of levers.

Although the turning radius is essentially zero with the fixed axle type of friction drive mower, it requires a relatively complex transmission, since steering is totally dependent on regulating the speed and direction of each rear wheel independently. In addition, when cutting along the corner of a building, this type of vehicle can usually not be steered around the corner until after the rear wheels clear the edge of the corner so that an area of grass on the far side of the corner remains uncut, unless extreme caution is exercised to cover it in the first pass.

SUMMARY OF THE INVENTION

The invention provides a power driven self-propelled lawn mower of the type having a frame and ground engagement wheels at the front and rear of the frame, with a mowing deck between the front and rear wheels. Each rear wheel is mounted to the frame so as to be pivotable about a generally vertical axis and steering linkage is connected to each rear wheel so as to steer both rear wheels in unison. The steering linkage causes the rear wheel axle centerlines to intersect at a pivot point which is at the extreme lateral edge of the mowing deck when the rear wheels are in position so as to produce a minimum turning radius of the mower. Thus, the mowing deck can be maneuvered around corners and other obstacles so as to minimize the number of passes required to make a cut, and reduce backing up and finish trimming.

In one aspect, the rear wheels are driven and the frame is shaped so as to create large spaces fore and aft of the crossbar into which the rear wheels may turn without interference with the frame at sharp turning angles. In this aspect, the driving transmission may be a variable hydrostatic motor driving a differential which in turn drives a double universal joint of each rear wheel. Each rear wheel is supported by a hinge through which the corresponding universal joint passes. The hinges are attached to a crossbar which provides the desired wheel spacing, provides the necessary room for the rear wheels when they are turned to the minimum turning radius, supports the transmission and ties into the main frame of the tractor, which also provides clearance for the rear wheels.

In another aspect, the mower can be provided with a pair of front wheels, each of which is a free pivoted caster which is not steered. When the rear wheels are steered, they determine the center of turning at the locus where projections of the axes of their axles intersect, and the front wheels automatically follow and turn about that center.

DETAILED DESCRIPTION OF THE PREFERRED EMBODIMENTS

Referring to FIGS. 1–4, a tractor 10 of the invention has a pair of rear ground engagement wheels 12 and 14 which rotate about axes 16 and 18, respectively, which are the center lines of the respective axles 20 and 22 of the wheels 12 and 14. The axles 20 and 22 are supported and journalled by respective yokes 21 and 23 which are pivoted at the opposite ends of a crossbar 24 to rotate about vertical axes 25 and 27 (FIGS. 6 and 7). The crossbar 24 extends laterally of the longitudinal axis of the tractor 10 and is secured to main frame 26 of tractor 10 by shaft 28 which allows relative pivoting of the crossbar 24 relative to the main frame 26 about the axis of shaft 28. The shaft 28 is generally horizontal, aligned with the longitudinal axis 19 of the tractor 10 and journalled in bearing 29 (FIG. 5), which is secured to the main frame 26. A nut 31 threaded onto the end of the shaft 28 fixes the shaft 28 axially.

The main frame 26 extends forwardly from where it is secured to shaft 28 to where it mounts a steering column 33, a steering wheel 30 and associated steering gear. From there, the main frame 26 extends further forwardly to where it mounts a pair of laterally spaced apart front ground engagement wheels 32 and 34 at the ends of front crossbar 35, which is welded to and forms part of the main frame 26. The wheels 32 and 34 are mounted so as to rotate about respective axes 36 and 38, which are the center lines of their respective axles 37 and 39.

Figure 4:
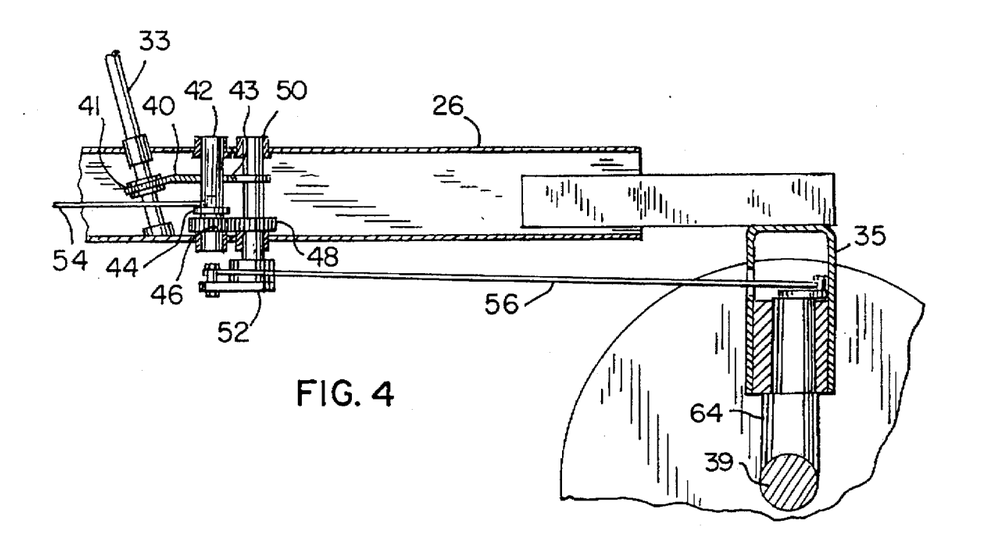
FIG. 4 is a detail side-sectional view of the steering gear for the mower of FIGS. 1–3, illustrating the linkage for steering the front wheels.

Referring particularly to FIG. 4, steering wheel 30 is fixed to steering column 33 which is journalled in main frame 26. Column 33 is mechanically connected to pinion gear 41, which meshes with segment gear 40 so that when column 33 is turned (by the steering wheel 30), shaft 50, to which segment gear 40 is fixed and which is journalled in frame 26, is turned with a gear reduction. Segment gear 40 is slotted at 43 to provide clearance with shaft which is also journalled in frame 26. Shaft 50 has mounted on it pinion gear 48 and double arm 52, so that both the gear 48 and arm 52 turn with the shaft 50.

Shaft 42 mounts an arm 44, which is used for turning the rear wheels as further described below, and also mounts a gear 46 which is in meshing engagement with gear 48. Double arm 52 has ends connected by respective linkage rods 54 and 56 to respective front arms 58 and 60. Pivotal connections are provided at the ends of the linkage rods 54 and 56 (and at the ends of linkage rods 74, 82 and 84, described below), as is well known in the art. The arms 58 and 60 are fixed to respective steering spindles 62 and 64, which are journalled to the main frame 26 and connected at their lower ends to respective axles 37 and 39 of the respective front wheels 32 and 34. Thus, turning the steering wheel 30 pivots the front wheels 32 and 34 about steering spindles 62 and 64 so as to effect, in part, steering of the tractor 10. It should be noted, however, that the particular front wheel steering gear used does not form part of the invention and any suitable front wheel steering gear may be employed to practice the invention.

Figure 12:
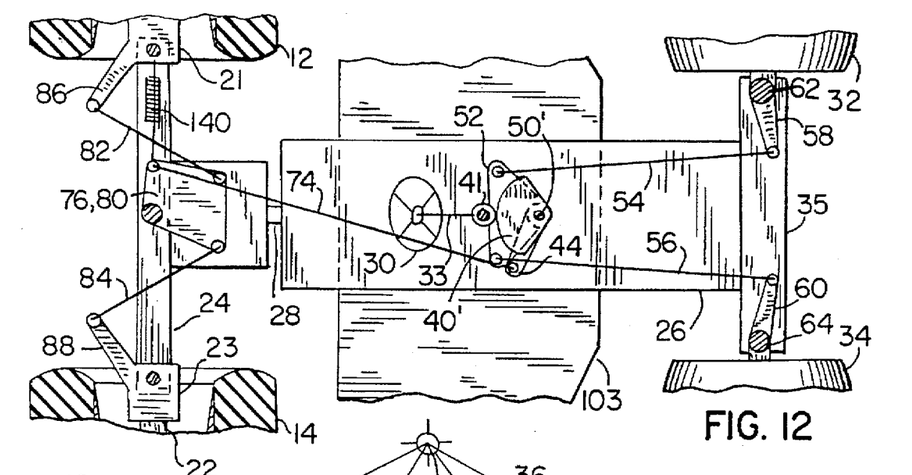
FIG. 12 is a view similar to FIG. 2 of an alternate embodiment of steering gear of the invention.
Figure 13:
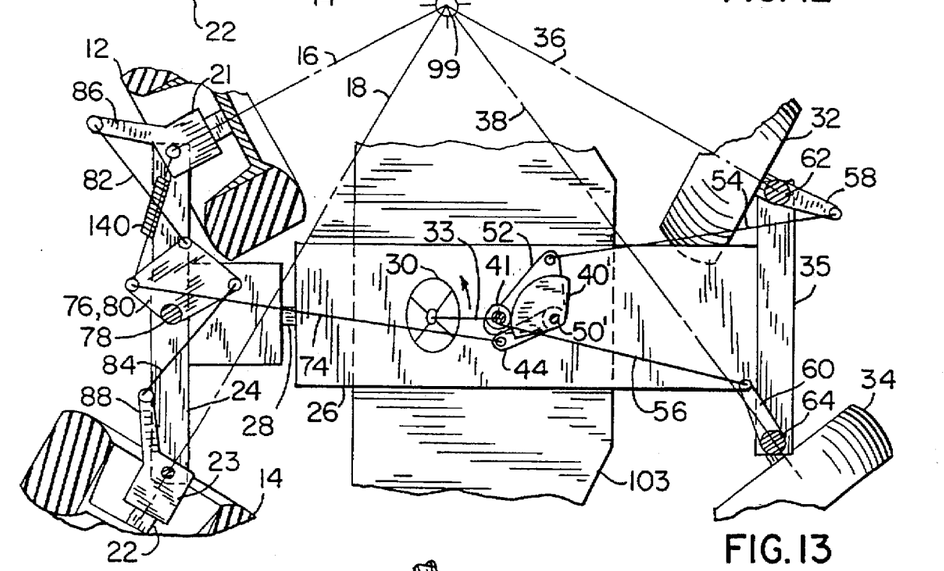
FIG. 13 is a view similar to FIG. 3 of the steering gear of FIG. 12.
Figure 14:
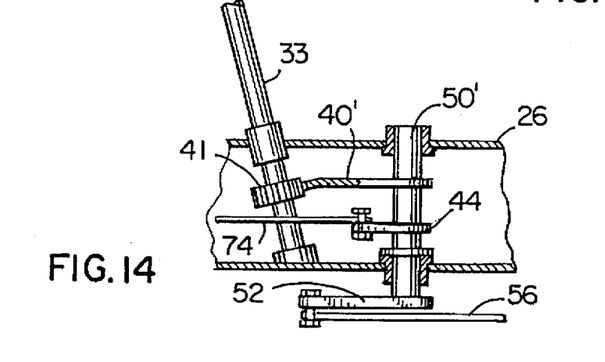
FIG. 14 is a view similar to FIG. 4 of the steering gear of FIGS. 12 and 13.

Alternatively, shaft 42 could be eliminated and arm 44 mounted on shaft 50', with linkage rod 74 crossing the centerline of the tractor, as shown in FIGS. 12, 13 and 14, to effect turning of the front and rear wheels in unison. In this embodiment, segment gear 40' need not be slotted since shaft 42 is eliminated.

Figure 5:
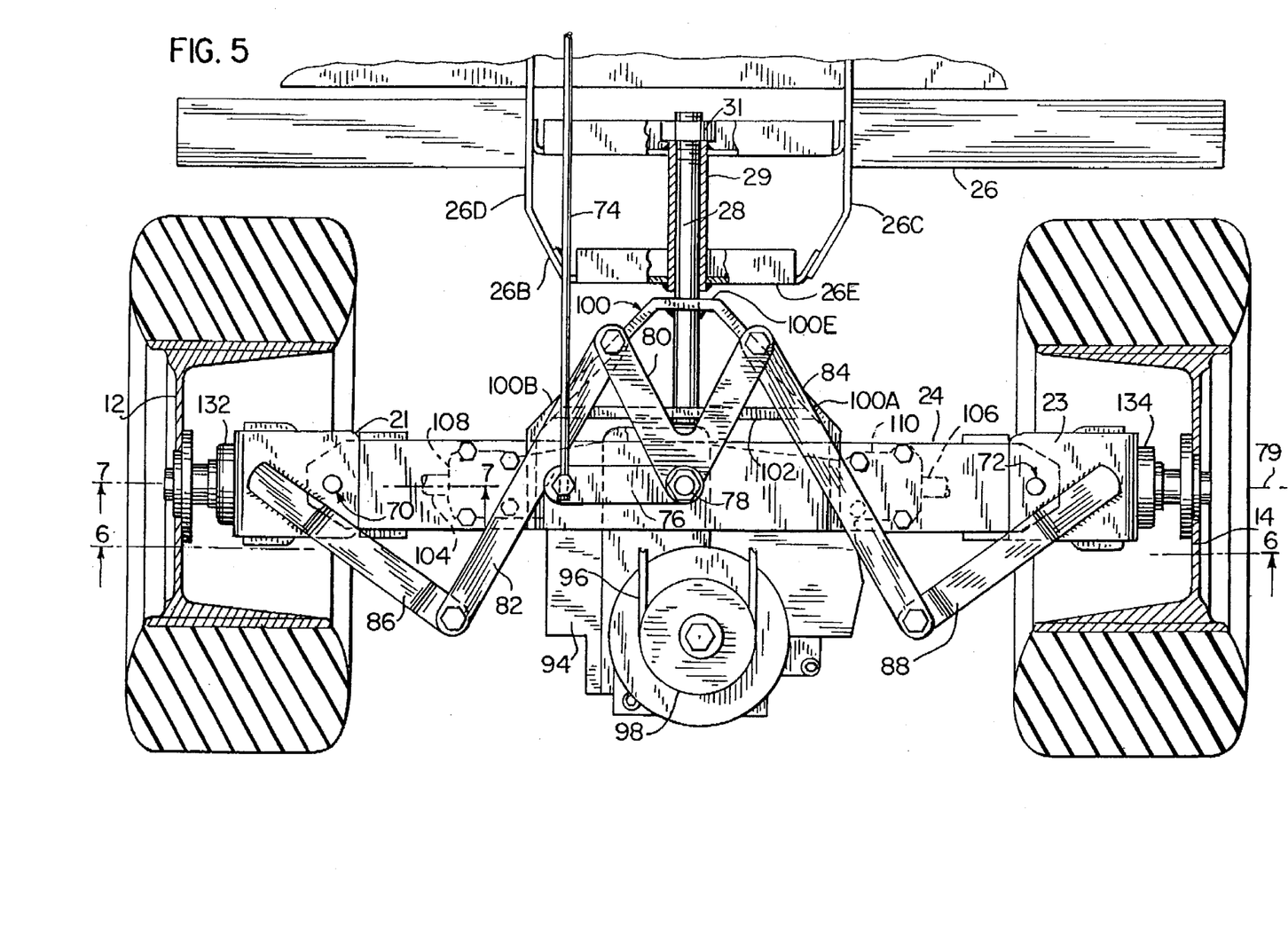
FIG. 5 is a top-plan view of the tractor illustrating the linkage for steering the rear wheels.
Figures 6, 7:
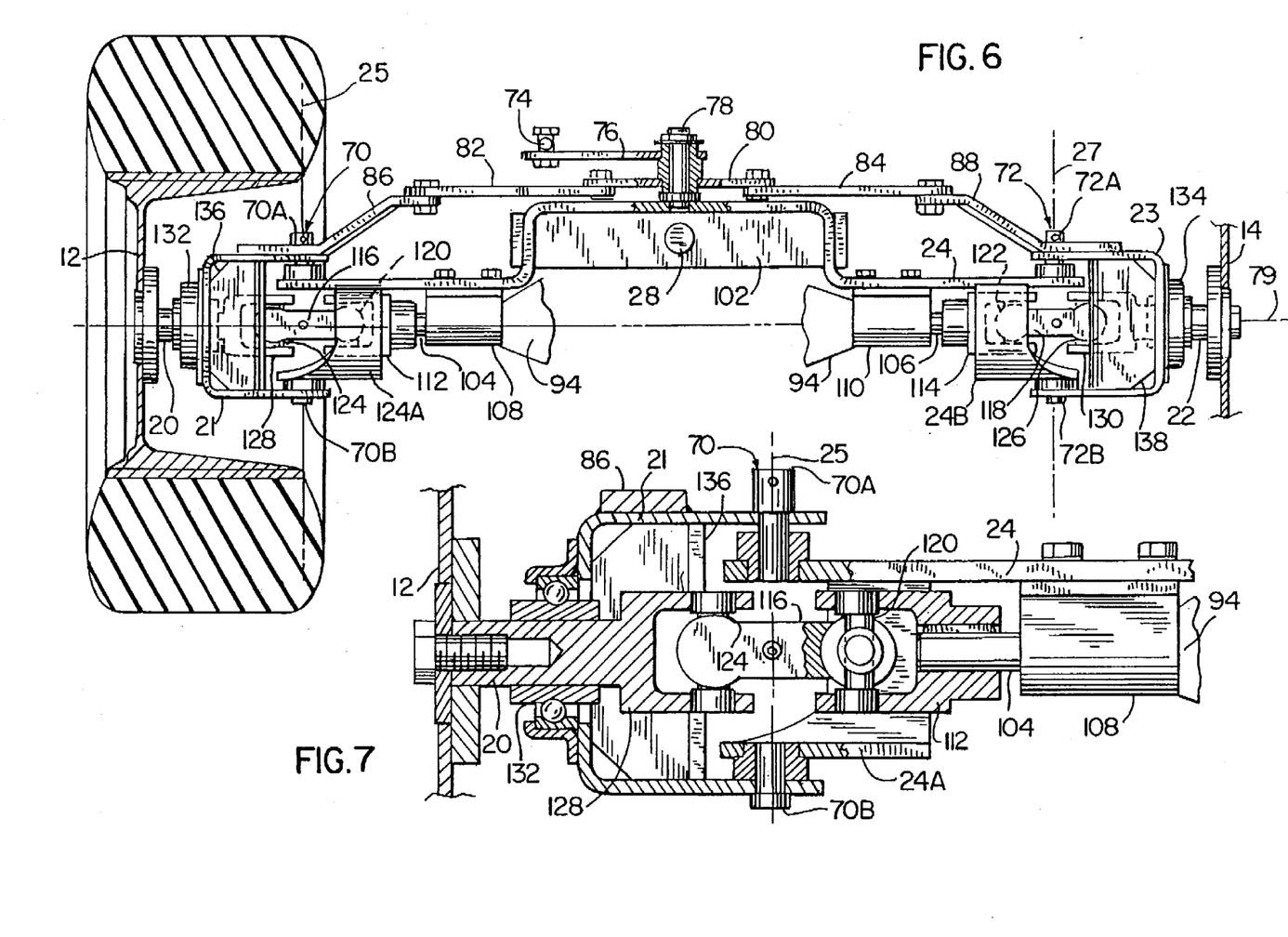
FIG. 6 is a fragmentary rear plan view illustrating the drive gear, steering linkage and support for the rear wheels.
FIG. 7 is a detailed fragmentary view illustrating the support, drive and steering linkages for the left rear wheel.

Steering of the rear wheels is accomplished by pivoting the rear wheels 12 and 14 about kingpins 70 and 72 (See FIGS. 5–7). Linkage rod 74 has its forward end pivotally attached to the end of arm 44 and its rear end pivotally attached to arm 76, the details of which are best shown in FIGS. 5 and 6. Arm 76 is fixed to shaft 78 so as to rotate shaft 78, which rotates double arm 80, which is also fixed to shaft 78 (in FIGS. 2, 3 and 8, the arm 76 and arm 80 are shown as a single unit for simplicity, since they rotate together). It is preferred that the rotary axis of shaft 78, which is generally vertical and perpendicular to the longitudinal axis 19 of the tractor, be located so as to intersect the longitudinal axis 19 of the tractor and within approximately a distance equal to the diameter of the rear wheels (including the tire, 10 inches in the preferred embodiment) either fore or aft of the rear drive axis 79, which is perpendicular to the longitudinal axis 19 of the tractor and coaxial with the axles 20 and 22 when they are in the straight ahead position. Linkage rods 82 and 84 are pivotally attached at their forward ends to the ends of double arm 80 and are pivotally attached at their rearward ends to respective arms 86 and 88 which are welded to respective yokes 21 and 23.

The respective yokes 21 and 23 are pivotally attached by the kingpins 70 and 72 to the ends of crossbar 24 to rotate about the respective axes 25 and 27 (FIG. 6), which are the axes of the kingpins 70 and 72. As best shown in FIGS. 6 and 7, each kingpin 70 and 72 includes an upper pin 70A and 72A and a lower pin 70B and 72B, respectively. The upper pins 70A and 72A are journalled in the main run of the crossbar 24 and the lower pins 70B and 72B are journalled in portions 24A and 24B which depend from the main run of the crossbar 24, with the respective inner yokes 112 and 114 received in spaces defined within the portions 24A and 24B.

Crossbar 24 also mounts a conventional drive transmission 94, such as a hydrostatic transmission, which may be driven by the engine of the tractor through a belt 96 and pulley 98. Crossbar 24 is secured by welding and framing members 100 and 102, to shaft 28, which, as stated above extends horizontally in the direction of the longitudinal axis of the main frame 26 and is journalled to the main frame 26 so as to allow pivoting of the crossbar 24 relative to the main frame 26 about the axis of the shaft 28, while securing the crossbar 24 axially relative to the main frame 26.

Referring to FIGS. 6 and 7, driveshafts 104 and 106, which are coaxial with drive axis 79, extend from each side of the transmission 94 and are journalled in bearing blocks 108 and 110 which form part of the transmission assembly and are bolted to the crossbar 24. A universal joint inner yoke 112 and 114 is secured to each respective end of the bearing blocks 108 and 110. The inner yokes 112 and 114 are fixed to their respective drive shafts 104 and 106 with a splined, keyed, pinned or similar connection which secures them to the respective drive shafts 104 and 106 so as to prevent relative axial or rotational movement between the yokes and their connected shafts.

An intermediate double-ended yoke 116 and 118 is secured to opposed arms of respective universal joint crosses 120 and 122, each of which has its other (orthogonal) set of opposed arms journalled in the respective inner yokes 112 and 114. The opposite, or outer, end of each double yoke 116 and 118 is journalled to opposed arms of respective universal joint crosses 124 and 126, each of which has the ends of its orthogonal set of opposed arms journalled in respective outer yokes 128 and 130.

The outer yokes 128 and 130 are secured to or are integral with (as shown in FIG. 7) the respective axles 20 and 22 of the wheels 12 and 14. The respective axles 20 and 22 are journalled in their respective yokes 21 and 23 by respective bearings 132 and 134, the inner races of which allow the respective axles 20 and 22 to slide axially relative to them. Gussets or reinforcements 136 and 138 may be provided to strengthen the yokes 21 and 23 and provide stops which abut the crossbar 24 at the right and left limits of turning the wheels 12 and 14.

The kingpins 70 and 72 are preferably positioned relative to the respective double yokes 116 and 118 so that their axes 25 and 27 generally bisect the respective double yokes 116 and 118, particularly at high angles of steering the rear wheels. Such centering of the kingpins relative to the double yokes provides for a smoother and more even transfer of power by the double universal joint that connects the drive shafts 104 and 106 to their respective axles 20 and 24.

Figure 1:
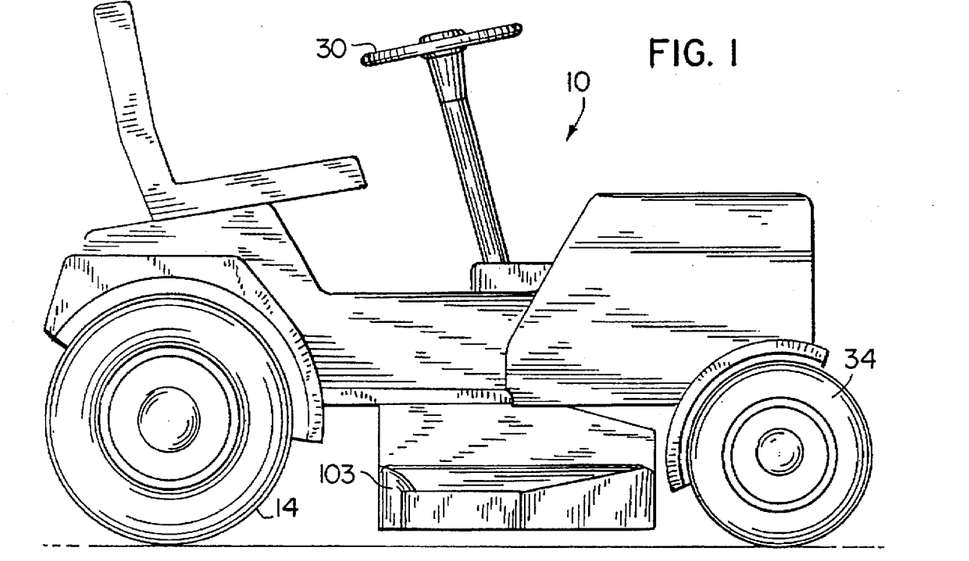
FIG. 1 is a side-plan view of a riding lawn tractor incorporating the invention.
Figure 2:
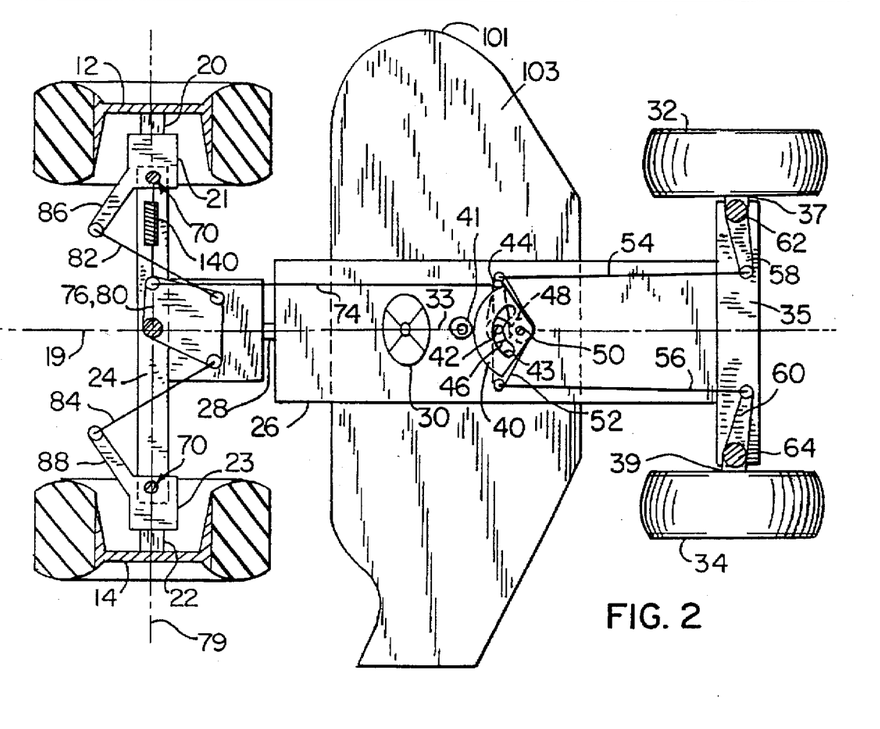
FIG. 2 is a top-plan view of the tractor of FIG. 1 illustrating schematically elements of the invention.
Figure 3:
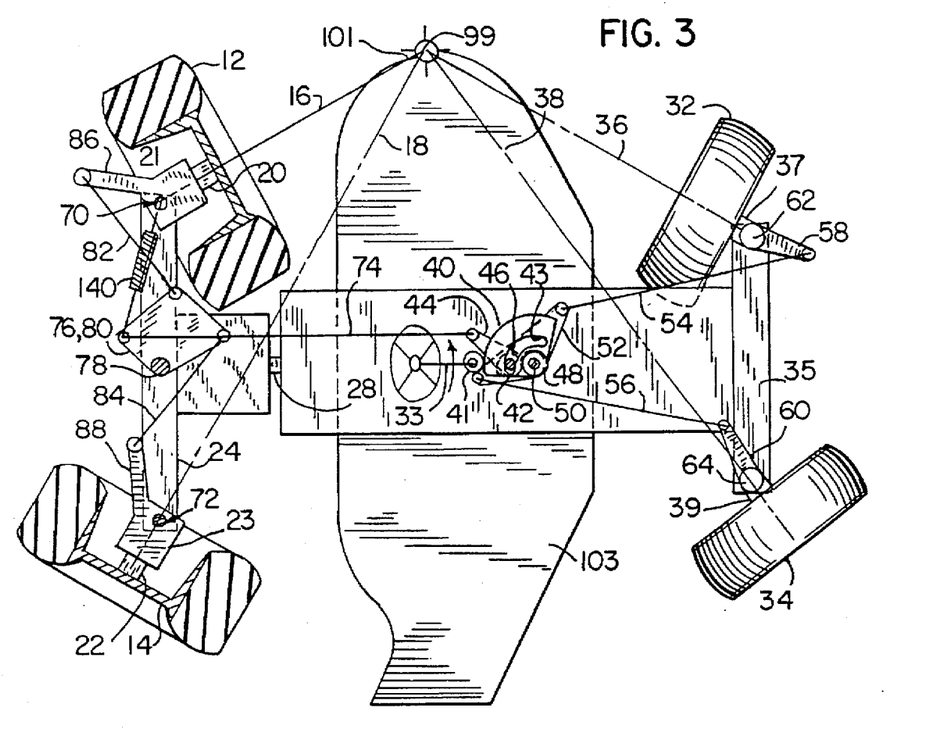
FIG. 3 is a view similar to FIG. 2 but illustrating the tractor turning to its limit leftwardly so that the turning radius of the mower is at a minimum.

Referring particularly to FIG. 5, the rear corners 26A and 26B of main frame 26 are truncated by being angled between longitudinal frame members 26C and 26D and crosspiece 26E. In addition, the corners 100A and 100B of framing member 100, which is secured to crossbar 24, are similarly truncated by connecting longitudinal members 100C and 100D to crosspiece 100E at an angle. Truncating these corners in this manner creates a space inward of each rear wheel 12 and 14 within which each rear wheel can be turned at a high angle so as to bring the locus 99 of the axes of the tractor wheels in close (as shown in FIG. 3), at, or even under the lateral extremity 101 of the mower deck 103. In practicing the invention, it is preferred that the locus 99 be located within at most 4 inches of the extremity 101, and preferably within 2 inches.

Referring particularly to FIG. 3, it is preferred to provide a spring 140 (not shown in FIG. 5 for clarity) so as to help center the steering gear and resist torques to which the steering gear may be subjected when power is transferred to the rear wheels, particularly when the tractor is being turned. In the embodiment illustrated, this may be accomplished by making the spring 140 an extension spring and having it extend between the pivot point of linkage 74 on arm 76 and kingpin 70, so that no matter which way the tractor is steered, the spring 140 will always tend to center the steering gear.

Figure 8:
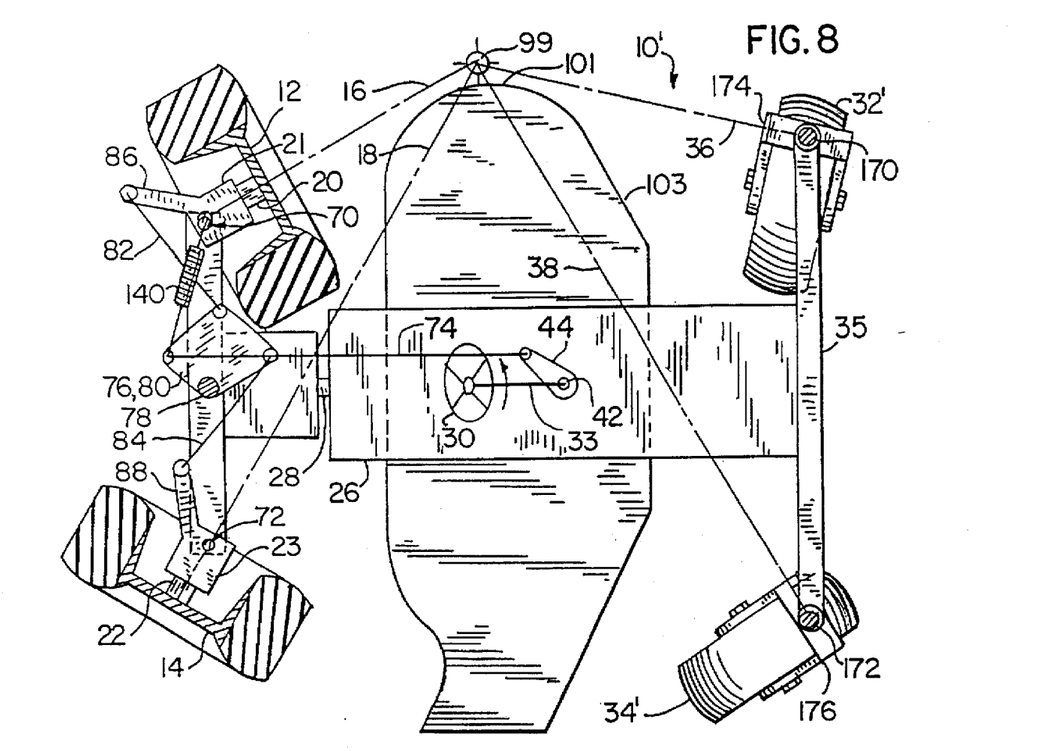
FIG. 8 is a view similar to FIG. 3 of an alternate embodiment of the invention.
Figure 9:
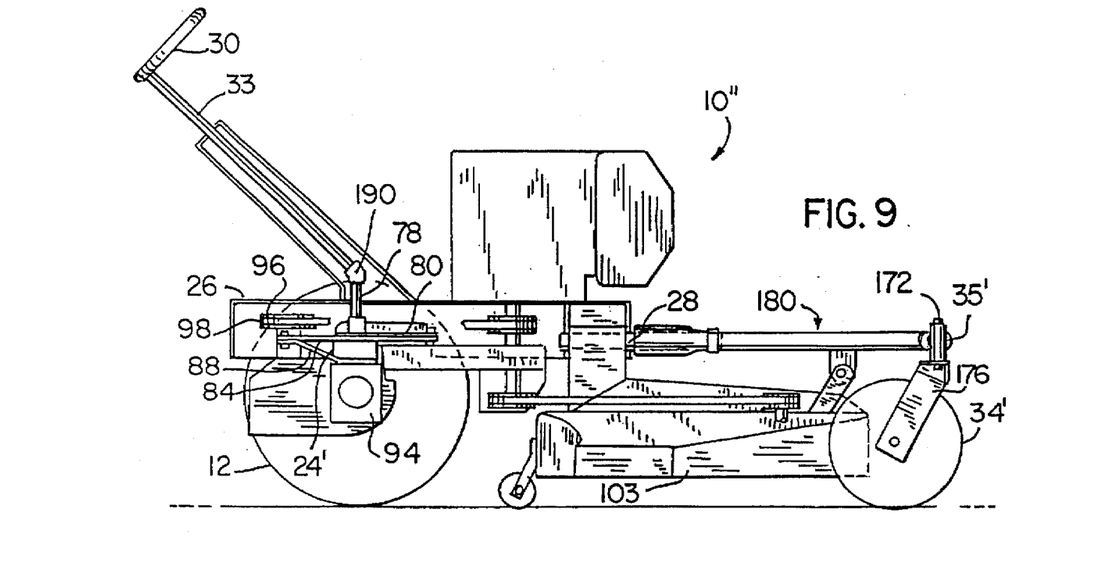
FIG. 9 is a view similar to FIG. 1 of a walk behind self-propelled lawn mower of the invention.

FIG. 8 illustrates an alternate embodiment 10' which is identical in all respects to the embodiment illustrated in FIGS. 1–7, except that in the embodiment of FIG. 8 the front wheels are not steerable. Corresponding elements have been labelled with the same reference number in FIG. 8 as in the previously described embodiment. In FIG. 8, the front wheels 32' and 34' are free pivoted casters, which pivot about kingpins 170 and 172. A side view of front wheels 32' and 34' like the wheels used in the embodiment of FIG. 8 is shown in FIG. 9. The kingpins 170 and 172 are journalled at the respective ends of the cross bar 35 and at their lower ends are fixed to respective caster yokes 174 and 176, which have inclined legs that straddle the respective wheels 32' and 34', with the axle of each wheel extending between the legs of the corresponding caster yoke. In this embodiment, by only steering the rear wheels, the front wheels 32' and 34' will automatically adjust to the turning radius determined by steering the rear wheels 12 and 14. Thereby, the front steering linkage is eliminated.

In this embodiment, it may be desirable to pivot the front crossbar 35 relative to the main frame 26, rather than pivot the rear crossbar 24 (with shaft 28), particularly if pivoting the front crossbar and fixing the rear crossbar could simplify the rear steering linkage.

Figure 10:
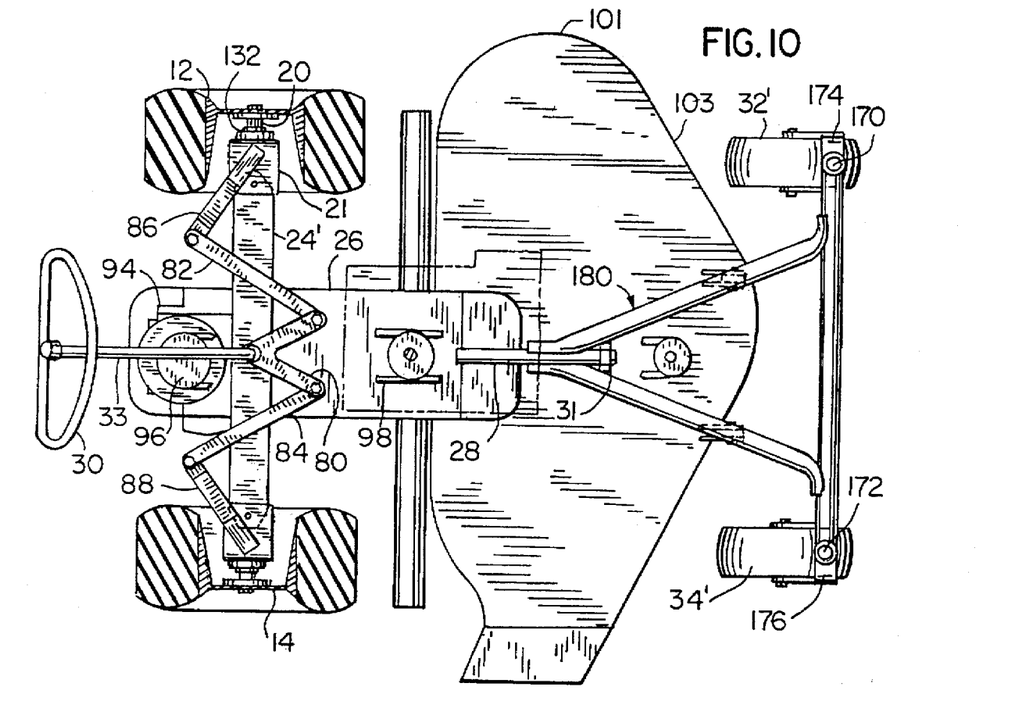
FIG. 10 is a top-plan fragmentary schematic view of the mower of FIG. 9.

FIGS. 9 and 10 illustrate a third embodiment 10" which is identical to the embodiment illustrated in FIG. 8, except that it is a walk behind tractor rather than a riding tractor and pivots the front and fixes the rear crossbar to the main frame. Corresponding elements are labelled with the same reference numbers. In this embodiment, crossbar 24' is fixed to the main frame 26, shaft 28 is secured to the front of the main frame 26, and a subframe 180 is pivotally attached to the shaft 28 and is secured at its forward end to front crossbar 35'. In addition, steering column 33 turns shaft 78 directly, for example through a universal joint 190.

Figure 11:
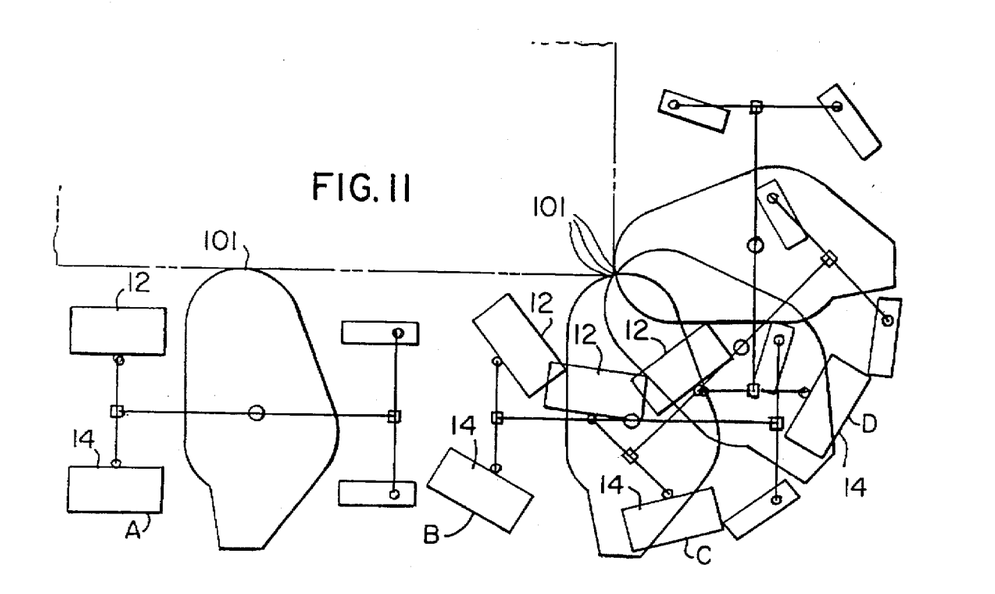
FIG. 11 is a schematic view illustrating a mower of the invention maneuvering around a corner.

FIG. 11 illustrates how any one of the previously described embodiments may be maneuvered around a right angle corner so as to cut grass growing at the corner of the building. In position A, the tractor is approaching the corner and has not yet begun turning. In position B, when the extreme lateral edge 101 of the mower deck 103 has come even with the corner, the driver commences turning the wheels so as to steer around the corner and, since the center of the turning radius is essentially at the extremity 101 of the mower deck 103, the edge of the mower deck follows the corner almost exactly, thereby cutting essentially all of the grass growing around the corner. Thus, grass growing at the corner can be cut without having to back up or make a second pass, and with only minimal finish trimming, if any.

Many modifications and variations to the preferred embodiments described will be apparent to those skilled in the art. Therefore, the invention should not be limited to the embodiments described but should be defined by the claims which follow.

I claim:

1. In a power driven self-propelled lawn mower having a frame, ground engagement wheels at the front and rear of the frame, said ground engagement wheels including a pair of wheels at the rear of the frame which are spaced apart along a lateral axis which is orthogonal to a longitudinal axis of the frame and having a mowing deck supported by said frame between said front and rear wheels, the improvement wherein:

each rear wheel is mounted to said frame so as to be pivotable about a kingpin having a generally vertical axis;

steering gear is connected to each rear wheel so as to steer said wheels in unison about a locus of projections of axes of axles of said rear wheels; and said locus is within four inches of an extreme lateral edge of said mowing deck when said rear wheels are in position so as to produce a minimum turning radius of said mower; wherein said steering gear includes a double arm mounted to be rotatable about a generally vertical axis, said double arm being connected to linkages for turning each rear wheel and to a linkage for being rotated by an operator of said mower, said axis perpendicularly intersecting a longitudinal axis of said tractor and being positioned within a distance equal to the diameter of the rear wheels fore or aft of a rear drive axis of said mower.

2. In a power driven self-propelled lawn mower having a free, ground engagement wheels at the front and rear of the frame, said ground engagement wheels including a pair of wheels at the rear of the frame which are spaced apart along a lateral axis which is orthogonal to a longitudinal axis of the frame and having a mowing deck supported by said frame between said front and rear wheels, the improvement wherein:

each rear wheel is mounted to said frame so as to be pivotable about a kingpin having a generally vertical axis;

steering gear is connected to each rear wheel so as to steer said wheels in unison about a locus of projections of axes of axles of said rear wheels; and said locus is within four inches of an extreme lateral edge of said mowing deck when said rear wheels are in position so as to produce a minimum turning radius of said mower;

wherein said rear wheels are driven and said frame includes a crossbar for supporting said rear wheels and drive gear for driving said rear wheels, said drive gear including a double universal joint for each rear wheel.

3. The improvement of claim 2, wherein one of said universal joints is supported at each end of said crossbar.

4. In a power driven self-propelled lawn mower having a frame, ground engagement wheels at the front and rear of the frame, said ground engagement wheels including a pair of wheels at the rear of the frame which are spaced apart along a lateral axis which is orthogonal to a longitudinal axis of the frame and having a mowing deck supported by said frame between said front and rear wheels, the improvement wherein:

each rear wheel is mounted to said frame so as to be pivotable about a kingpin having a generally vertical axis;

steering gear is connected to each rear wheel so as to steer said wheels in unison about a locus of projections of axes of axles of said rear wheels; and said locus is within four inches of an extreme lateral edge of said mowing deck when said rear wheels are in position so as to produce a minimum turning radius of said mower;

wherein said rear wheels are driven and said frame includes a crossbar for supporting said rear wheels and said drive gear for said rear wheels, said crossbar being affixed to a main frame so as to provide spaces fore and aft of said crossbar into which said rear wheels may pivot without interference with said frame; and wherein said crossbar is secured to said main frame so as to be pivotable relative to said main frame about a horizontal axis.

5. In a power driven self-propelled lawn mower having a frame, ground engagement wheels at the front and rear of the frame, said ground engagement wheels including a pair of wheels at the rear of the frame which are spaced apart along a lateral axis which is orthogonal to a longitudinal axis of the frame, and having a mowing deck supported by said frame between said front and rear wheels, the improvement comprising:

a kingpin for connecting each said rear wheel to said frame, each said rear wheel being pivotable about an axis of said kingpin; and steering gear for turning said rear wheels in unison about said axes of said kingpins so as to steer said rear wheels;

wherein said front wheels are free pivoted casters; and wherein said rear wheels are driven and said frame includes a crossbar for supporting said rear wheels and drive gear for driving said rear wheels, said drive gear including a double universal joint for each rear wheel.

6. The improvement of claim 5, wherein one of said universal joints is supported at each end of said crossbar.

7. In a power driven self-propelled lawn mower having a frame, ground engagement wheels at the front and rear of the frame, said ground engagement wheels including a pair of wheels at the rear of the frame which are spaced apart along a lateral axis which is orthogonal to a longitudinal axis of the frame, and having a mowing deck supported by said frame between said front and rear wheels, the improvement comprising:

a kingpin for connecting each said rear wheel to said frame, each said rear wheel being pivotable about an axis of said kingpin; and steering gear for turning said rear wheels in unison about said axes of said kingpins so as to steer said rear wheels;

wherein said front wheels are free pivoted casters; and wherein said rear wheels are driven and said frame includes a crossbar for supporting said rear wheels and drive means for said rear wheels, said crossbar being affixed to a main frame so as to provide spaces fore and aft of said crossbar into which said rear wheels may pivot without interference with said frame; and wherein said crossbar is secured to said main frame so as to be pivotable relative to said main frame about a horizontal axis.

8. In a power driven self-propelled lawn mower having a frame, ground engagement wheels at the front and rear of the frame, said ground engagement wheels including a pair of wheels at the rear of the frame which are spaced apart along a lateral axis which is orthogonal to a longitudinal axis of the frame, and having a mowing deck supported by said frame between said front and rear wheels, the improvement comprising:

a kingpin for connecting each said rear wheel to said frame, each said rear wheel being pivotable about an axis of said kingpin; and steering gear for turning said rear wheels in unison about said axes of said kingpins so as to steer said rear wheels;

wherein said front wheels are free pivoted casters; and wherein said steering gear includes a double arm mounted to be rotatable about a generally vertical axis, said double arm being connected to linkages for turning each rear wheel and to a linkage for being rotated by an operator of said mower, said axis perpendicularly intersecting a longitudinal axis of said tractor and being positioned within a distance equal to the diameter of the rear wheels fore or aft of a rear drive axis of said mower.

* * * * *

UNITED STATES PATENT AND TRADEMARK OFFICE
CERTIFICATE OF CORRECTION

Patent No.    :   5,667,032

Dated         :   September 16, 1997

Inventor(s)   :   Igor Kamlukin

It is certified that errors appear in the above-identified patent and that said Letters Patent is hereby corrected as shown below:

Col. 3, line 16 after "shaft", insert --42--.

Col. 6, line 34 (claim 2) change "free" to --frame--.

Signed and Sealed this

Sixteenth Day of December, 1997

*Attest:*

BRUCE LEHMAN

*Attesting Officer*  *Commissioner of Patents and Trademarks*